(12) United States Patent
Nojima

(10) Patent No.: US 6,442,538 B1
(45) Date of Patent: Aug. 27, 2002

(54) VIDEO INFORMATION RETRIEVAL METHOD AND APPARATUS

(75) Inventor: Hiroshi Nojima, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/317,435

(22) Filed: May 24, 1999

(30) Foreign Application Priority Data

May 27, 1998 (JP) .......................................... 10-145245

(51) Int. Cl.[7] .............................................. G06F 17/30
(52) U.S. Cl. .......................... 707/1; 382/181; 345/723
(58) Field of Search ........................ 707/1–6; 345/716, 345/719, 723; 382/116, 162–167, 173–177, 181, 184, 190–195, 203–206, 270

(56) References Cited

U.S. PATENT DOCUMENTS

| | | | | |
|---|---|---|---|---|
| 6,021,231 A | * | 2/2000 | Miyatake et al. | ........... 382/305 |
| 6,061,056 A | * | 5/2000 | Menard et al. | ............. 345/327 |
| 6,088,484 A | * | 7/2000 | Mead | ......................... 382/232 |
| 6,253,201 B1 | * | 6/2001 | Abdel-Mottableb et al. | ... 707/4 |
| 6,298,482 B1 | * | 10/2001 | Seidman et al. | ............ 725/101 |

* cited by examiner

Primary Examiner—Hyung-Sub Sough
Assistant Examiner—Mary Wang
(74) Attorney, Agent, or Firm—Antonelli, Terry, Stout & Kraus, LLP

(57) ABSTRACT

The video information retrieval system includes a client for inputting video data or retrieving a registered video file, and a retrieval server for registering video data transmitted from the client and retrieving the registered video data in response to a request from the client. The retrieval server analyzes a video stream upon registration of the video data and separates contents of a video constituting the video stream. The server extracts annotation information such as image feature vectors for each of the separated video contents and stores the annotation information in a video information table as a video object. The retrieval server performs retrieval processing in a unit of object on the basis of the retrieval condition designated for each video object by the user and judges the simultaneous appearance on the basis of appearance time section information of the object coincident with the retrieval condition to thereby extract the user's desired video scene and present it to the user.

17 Claims, 17 Drawing Sheets

FIG.3

| | | 52 | | |
|---|---|---|---|---|
| | 521 | 522 | 523 | 524 |
| | FILE ID | LOCATION INFORMATION | CONTROL ATTRIBUTE INFORMATION | BIBLIOGRAPHICAL INFORMATION |
| 5201 | V01 | "¥¥SERVER1¥DIR1¥FILE1.MPG" | •••• | •••• |
| 5202 | V02 | "¥¥SERVER1¥DIR1¥FILE2.AVI" | •••• | •••• |
| 5203 | V03 | "¥¥SERVER1¥DIR2¥FILE3.MOV" | •••• | •••• |
| | ••• | ••• | ••• | ••• |

| | OBJECT ID | FILE ID | CONTENT ID | OBJECT ATTRIBUTE | BEGINNING TIME CODE | END TIME CODE |
|---|---|---|---|---|---|---|
| 5301 | O01 | V01 | C01 | video | 01:00:15:00 | 01:02:03:09 |
| 5302 | O02 | V01 | C02 | video | 01:00:45:00 | 01:01:44:29 |
| 5303 | O03 | V01 | C03 | audio | 01:00:13:15 | 01:02:15:00 |
| 5304 | O04 | V01 | C04 | text | 01:00:40:00 | 01:01:15:00 |
| | ... | ... | ... | ... | ... | ... |

| IMAGE ID | VIDEO OBJECT ID | TIME CODE | IMAGE FORMAT | IMAGE ITSELF | IMAGE FEATURE VECTOR |
|---|---|---|---|---|---|
| 541 | 542 | 543 | 544 | 545 | 546 |
| I01 | O01 | 01:00:15:10 | Bitmap | ..... | ..... |
| I02 | O01 | 01:00:30:00 | Bitmap | ..... | ..... |
| ... | ... | ... | ... | ... | ... |
| I03 | O02 | 01:01:45:20 | Bitmap | ..... | ..... |
| ... | ... | ... | ... | ... | ... |

| IMAGE ID | CENTER OF GRAVITY X | CENTER OF GRAVITY Y |
|---|---|---|
| 551 | 552 | 553 |
| I01 | 50 | 45 |
| I02 | 20 | 80 |
| I03 | 70 | 25 |
| ... | ... | ... |

| SCENE ID 561 | VIDEO FILE ID 562 | BEGINNING TIME CODE 563 | END TIME CODE 564 | REPRESENTA- TIVE TIME CODE 565 | IMAGE FORMAT 566 | IMAGE ITSELF 567 |
|---|---|---|---|---|---|---|
| S01 | V01 | 01:00:15:00 | 01:02:03:09 | 01:00:15:10 | Bitmap | ····· |
| S02 | V01 | 01:02:03:10 | 01:02:59:29 | 01:02:03:10 | Bitmap | ····· |
| S03 | V02 | 01:00:20:00 | 01:02:59:29 | 01:00:20:10 | Bitmap | ····· |
| ··· | ··· | ··· | ··· | ··· | ··· | ··· |

| TEXT ID | VIDEO FILE ID | BEGINNING TIME CODE | END TIME CODE | TEXT INFORMATION |
|---|---|---|---|---|
| T01 | V01 | 01:00:40:00 | 01:01:15:00 | YAMADA TARO |
| T02 | V02 | 01:01:20:05 | 01:01:30:27 | AMERICA |
| T03 | V03 | 01:01:00:21 | 01:01:30:08 | "TWILIGHT", "SUN" |
| ... | ... | ... | ... | ... |

571 572 573 574 575

5701
5702
5703

VIDEO INFORMATION RETRIEVAL METHOD AND APPARATUS

BACKGROUND OF THE INVENTION

The present invention relates to a database management system for storing video files electronically and reusing the video files and more particularly to video information retrieval method and apparatus and a recording medium effective in registration and retrieval of the video files coded in the content base by means of a database.

When desired video information is to be retrieved from a database in which video files are stored, it is more effective to retrieve the video information on the basis of not only bibliographical information of the video information such as a heading, a copyright holder and a preparation or photography date thereof but also a definite matter concerning an object appearing in the video information itself.

In a recent database management system, not only retrieval of a still image is made on the basis of keywords associated with the image but also the retrieval is made while an image analysis program is used in combination with the keywords. In such a database management system, when image data is registered therein, distinctive features such as overall coloring or tint, local tint and edge information of the image are previously extracted from the image in the form of image feature vectors by means of the image analysis program. In the retrieval, similarities of image feature vectors are compared, so that it is judged whether the retrieval is successful or not on the basis of the fact that an image having the similarity larger than a threshold coincides with a retrieval condition and an image having the similarity smaller than the threshold does not coincide therewith or retrieved results are arranged in order of the similarities to present a list thereof to a user so that the efficiency of retrieval is improved. Such a database management system is disclosed in, for example, JP-A-7-21198.

The image retrieval technique utilizing the image feature vectors as disclosed in the above publication can be also applied to the video management field. For example, a frame image representative of a video scene, of a series of frame images which are constituent elements of the video scene is extracted as a representative image. The extracted representative images are processed by means of the method similar to the above-mentioned management of the still image to calculate feature vectors of the images, so that it is easily realizable to retrieve a user's desired video scene through the retrieval of the representative images. The retrieval using the similarities of the representative images can be combined with an indirect retrieval of video performed so far and based on bibliographical information of video and comment information associated with sections of the video to thereby realize the retrieval of more real video images approximately.

Such a conventional video retrieval method by means of the evaluation of similarities using feature vectors of the representative images of the video has difficulties as follows: The video retrieval using the representative images of the video scene pays attention only to still images each produced at a time that the video scene is reproduced actually. Since there is motion in the video unlike the image, the representative images sometimes reproduce a picture different from the video scene that the user imagines in accordance with a selected representative image and the retrieval using the representative images is sometimes unsuccessful. For example, it is considered that a video scene that an object is moved from right to left and disappears in a background is registered in a database. When a representative image of a video scene is accidentally acquired at the time that the object is positioned at the right end, there is a problem that it is difficult to retrieve the video scene if a user designates another position, for example the left end, different from the right end as a position of the object and performs retrieval of the video. Further, when any object appears in a representative image of a video scene accidentally, it is difficult to retrieve the video scene due to impediment by the object in the representative image if the video scene is retrieved on the basis of only a background.

One of coding systems for video files involves a system in which video files are constituted by a plurality of video streams in which the background and the object (hereinafter both referred to as contents) are separated and coded to constitute the respective video streams in order to enhance the compression efficiency and the reusability of the video files. In this coding system, when information of the video files is reproduced, the video streams are combined to be reproduced as one video file. Even when the video files are coded in the content base as described above, there occurs a problem that the retrieval is difficult in the same manner as heretofore depending on a selected representative image if video data is registered by the conventional system on the basis of a reproduced video of combined contents.

SUMMARY OF THE INVENTION

It is an object of the present invention to provide a video information retrieval method and apparatus in which a user pays attention to individual contents appearing in a video and can set a retrieval condition to retrieve a video scene in a database system for managing video files coded in the content base.

According to an aspect of the present invention, there is provided a video retrieval method implemented by a computer in order to register video files in a database and retrieve any section of any video file. A computer constituting a video information retrieval system receives a video file including a plurality of video streams coded in each content which is a constituent element thereof. The video file is analyzed and each of a plurality of video streams is extracted as video element objects. Annotation information describable as a coincidence condition in retrieval is extracted for each of the extracted video element objects and the video element objects and the annotation information are registered in the database. When the user is to retrieve a video, coincidence with a retrieval condition in each video element object unit is judged on the basis of the retrieval condition for each of constituent elements of the video designated by the user. Set operation relative to appearance time sections of the video element objects coincident with the video retrieval condition is performed to thereby define a video scene constituting a retrieved result and present it to the user. According to a preferred aspect of the present invention, a video file including a video scene designated by the user is acquired from the database in response to a user's designation to the video scene and is presented to the user. According to the present invention, a background video and a subject video of a video scene are extracted separately to be recorded in the database and when the user retrieves a desired video scene, the background video and the subject video recorded in the database are retrieved separately to obtain a video scene near to the user's retrieval image from two kinds of retrieved information.

According to another aspect of the present invention, there is provided a retrieval apparatus for registering video files in the database and retrieve any section of any video file. The retrieval apparatus comprises analysis means for stream-analyzing a video file including a plurality of video streams coded in each of contents which are constituent elements and combined upon reproduction to be displayed and extracting each of the plurality of video streams as video element objects, extraction means for extracting annotation information describable as a coincidence condition in retrieval for each of the video element objects extracted by the analysis means, registration means for registering the video element object information and the annotation information in the database, retrieval means for judging coincidence in each video element object unit on the basis of a retrieval condition for each of constituent elements of a video designated by a user, and output means for performing set operation relative to appearance time sections of the coincident video element objects to define a video scene constituting a retrieved result and present it to the user.

In a preferable aspect of the present invention, a reference image referred upon retrieval is extracted from the video objects in the registration processing and an image feature vector representative of a feature of the reference image is acquired from the reference image. The reference image and the image feature vector are stored in relation to the video object. The reference image is extracted by making comparison of images at regular intervals with respect to video streams constituting the video objects and extracting, when images having large similarity are continued, an image at the head thereof as the reference image. The image feature vector includes analyzed results for overall tint, local tint and edge information of the reference image.

The above and other objects and novel features of the present invention will be apparent from the following description of the specification and the accompanying drawings.

BRIEF DESCRIPTION OF THE DRAWINGS

FIG. 3 is a diagram showing an example of a configuration of a video file management table;

FIG. 4 is a diagram showing an example of a configuration of a video element object management table;

FIG. 5 is a diagram showing an example of a on figuration of a reference-image-upon-retrieval management table or a reference frame management table;

FIG. 6 is a diagram showing an example of a configuration of a center-of-gravity-information management table;

FIG. 7 is a diagram showing an example of a configuration of a video scene management table;

FIG. 8 is a diagram showing an example of a configuration of a text annotation management table;

DESCRIPTION OF THE EMBODIMENTS

Figure 1:
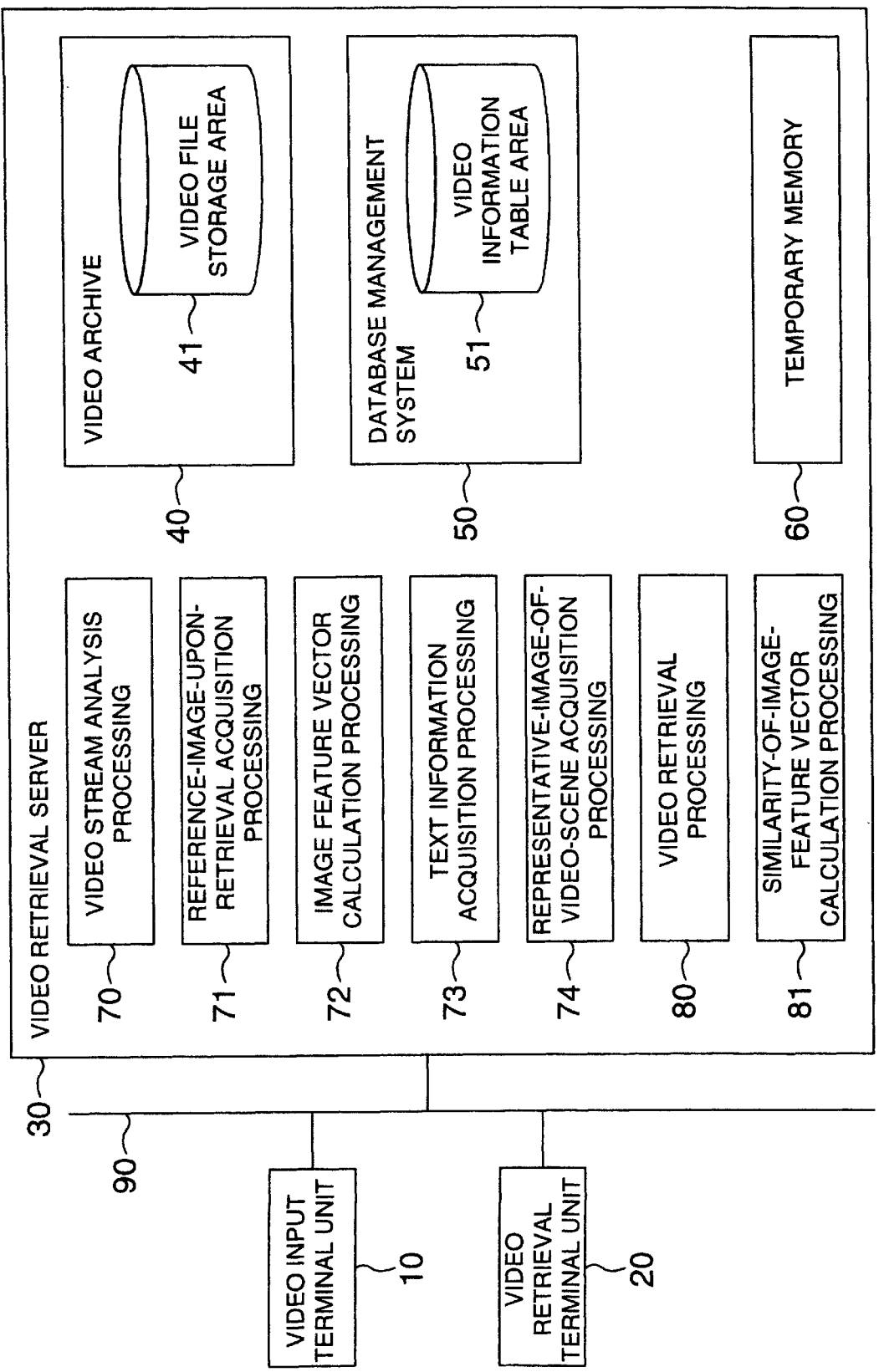
FIG. 1 is a block diagram schematically illustrating a database system of an embodiment according to the present invention.

FIG. 1 is a block diagram schematically illustrating a database system of an embodiment according to the present invention.

The database system of the embodiment is configured as a client-and-server type system as shown in FIG. 1. The database system comprises a video input terminal unit (client) 10, a video retrieval terminal unit (client) 20 and a video retrieval server 30 connected through a communication network 90 to one another. The video retrieval server 30 includes a video storage unit or video archive 40 for managing a video file storage area 41, a database management system 50 for managing a video information table area 51 in which various video information tables are stored, a temporary memory 60 in which data in the course of processing in each module is stored temporarily, and processing modules 70 to 74, 80 and 81. The video file storage area 41 is constituted by, for example, a high-speed magnetic disk. The processing modules include a video stream analysis processing module 70, a reference-image-upon-retrieval acquisition processing module or a reference frame acquisition processing module 71, an image feature vector calculation processing module 72, a text information acquisition processing module 73, a representative-image-of-video-scene acquisition processing module or a representative image acquisition processing module 74, a video retrieval processing module 80 and a similarity-of-image-feature-vector calculation processing module or a image feature vector calculation processing module 81. Definite processing functions of these processing modules are described later in detail. The video input terminal unit 10, the video retrieval terminal unit 20 and the video retrieval server 30 are all realized by a personal computer or a computer such as a work station. The respective processing modules 70 to 74, 80 and 81 included in the video retrieval server 30 are realized as program modules executed in the computer. The function of the server performed by the video retrieval server 30 and the function of the clients performed by the video input terminal unit 10 and/or the video retrieval terminal unit 20 are not required to be provided in independent apparatuses connected to one another through the communication network 90 and may be realized in the same apparatus.

In FIG. 1, when video data is to be registered in the database, the video data is first inputted to the video input terminal unit (client) 10 and then transmitted through the communication network 90 to the video retrieval server 30. In parallel with the transmission of the video data from the video input terminal unit 10 to the video retrieval server 30 or after completion of the transmission, information for retrieving the video data is extracted from the video and is registered in the database of the video file storage area 41 in the video archive 40.

More particularly, the video data is subjected to stream separation processing in the video stream analysis processing module 70 to be decomposed into a video stream, an audio stream, a text stream and other streams peculiar to individual video files so that video element objects are constituted. The video element objects are analyzed and registered in the database in accordance with kinds of the objects. In the case of the video element object composed of the video stream, the reference frame acquisition processing module 71 records a beginning time and an end time of its video stream and extracts a characteristic video frame in the video stream as a still image. With respect to the extracted still image, its image feature vector is calculated by the image feature vector calculation processing module 72 as a reference image upon retrieval or a reference frame. When a plurality of video streams are combined upon reproduction, it is necessary to transparentize a part of the image such as the background in one stream. This is generally named the chroma-key combination or the blue-back combination upon superposition. The transparent portion of the reference frame is removed before calculation of the image feature vector in consideration of even an alpha plane for judging whether dots are treated to be transparent in the chroma-key combination or not, so that an invisible portion is neglected upon reproduction even in the retrieval processing. In calculation of an image feature vector in the image feature vector calculation processing module 72, a rectangle that the transparent portion can be removed at its maximum is defined and the image feature vector is calculated within the rectangle. The place where the rectangle is positioned in the original image is recorded to thereby reflect the feature and the video image of the object to the reference frame information still more. Further, when the video element object is changed or moved, a plurality of reference frames are sometimes taken from one video element object. Time information and image feature vectors of the reference frames are stored in the database for retrieval. The image feature vector is a row of numerical data or numerical values. In the case of the video element object constituted by the text stream, the text information acquisition processing module 73 records a row of character codes and a beginning time and an end time concerning displaying of the row of character codes to be stored in the database. The text information is adapted to be able to be extracted from the video file automatically and in addition comment information by manual inputting of the operator is also adapted to be able to be treated and managed similarly. In the video element object composed of the audio stream and the streams peculiar to the individual video files, only a beginning time, an end time and a kind of the streams are recorded to be stored in the database.

In retrieval of video data coded in the content base, a retrieval condition is designated for each video element object on the basis of comment information (hereinafter referred to as annotation information) of the video expressed by a keyword, a row of numerical values or the like for retrieval of the video and extracted as described above by the representative image acquisition processing module 74 and the retrieval is then implemented.

The retrieval in the video retrieval processing module 80 is implemented with respect to the annotation information stored in the database and reference is not directly made to the video file in the course of the retrieval. The video file coinciding with the retrieval condition and the time section thereof are examined for each video element object stored in the database. When the retrieval condition is designated by operation of a set such as a logical product or a logical sum of a plurality of video contents, the same set operation is performed to the time section of the retrieved video and the result of the set operation is the result of the retrieval of the video. Thus, the user can retrieve a desired video scene while paying attention to individual objects appearing in the video by means of the image feature vector calculation processing module 81.

The video input terminal unit 10 is a terminal used when a video file is registered in the database. The video file is inputted through the video input terminal unit 10 and transmitted through the communication network 90 to the video retrieval server 30.

The video retrieval terminal unit 20 is a terminal operated by the user when the video file is retrieved. The video retrieval terminal unit 20 receives a retrieval condition for a video inputted by the user and performs presentation of a list of retrieved results, reproduction of the retrieved video scene and the like.

The video file transmitted from the video input terminal unit 10 is stored in the video archive 40 in the same format as it is. If it is possible to match in time with the video file of the original format upon reproduction, the format of the video file may be changed when it is stored and the video file having the changed format may be stored in the video archive.

Figure 2:
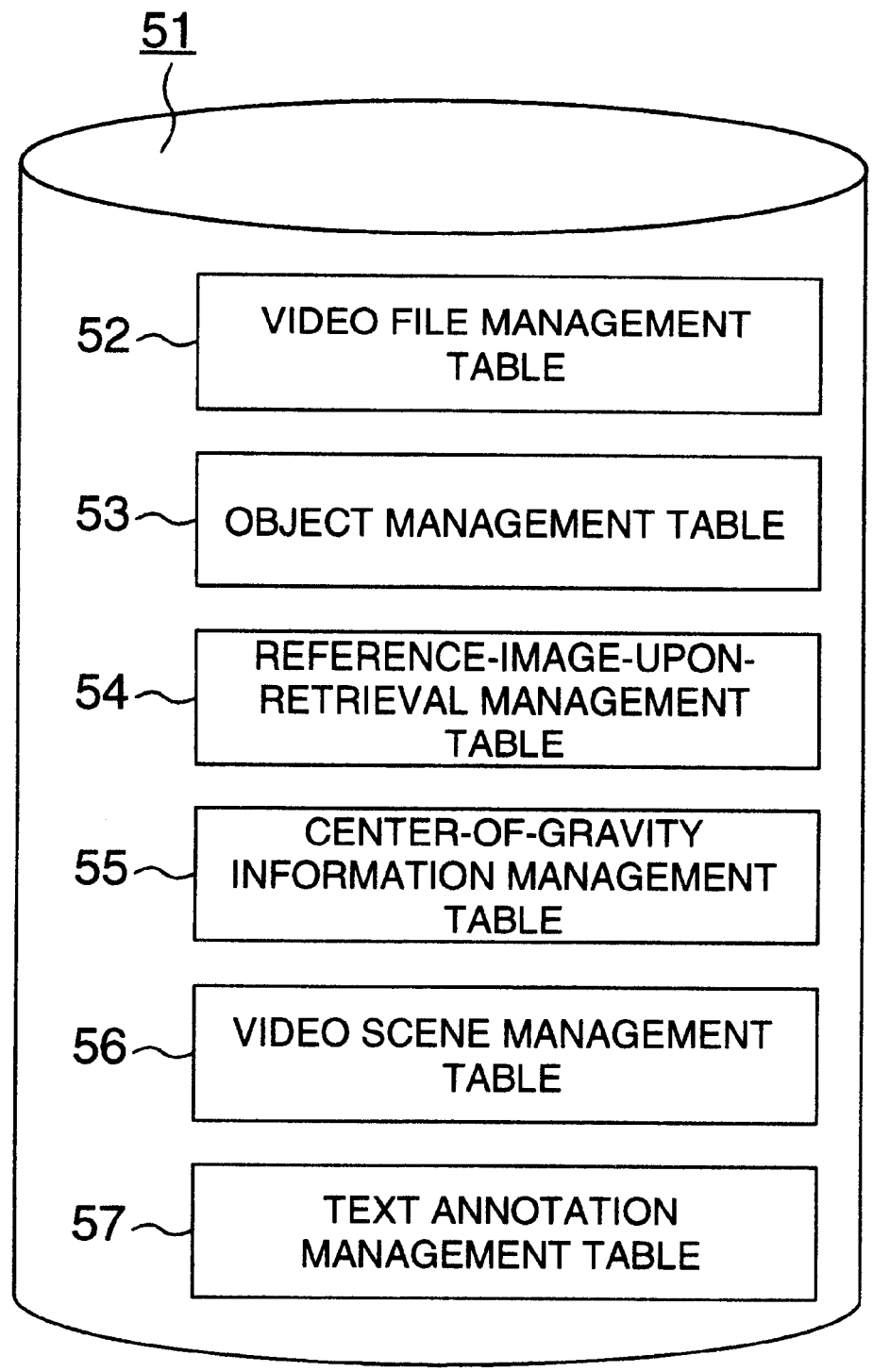
FIG. 2 is a diagram explaining an example of a table managed in a video information table area.

In the database management system 50, various annotation information extracted upon registration of the video file and relating to the video file is managed in separate table format within the video information table area 51. FIG. 2 shows a list of various tables managed within the video information table area 51. Included in the video information table area 51 are a video file management table 52, an object management table 53, a reference-image-upon-retrieval management table or a reference frame management table 54, a center-of-gravity information management table 55, a video scene management table 56 and a text annotation management table 57. Various tables managed in the video information table area 51 are now described.

FIG. 3 shows an example of a configuration of the video file management table 52. Stored in columns of the video file management table 52 are a file ID 521 representative of an identifier of the video file, location information 522 indicating a location where the video file is stored, control attribute information 523 such as a format, a length and an access power of the video file and bibliographical information 524 such as information of a copyright holder and a performer and a preparation or photography date. The file ID 521 is a unique value in the video file management table 52 and corresponds to the location information 522 in one-to-one manner.

FIG. 4 shows an example of a configuration of the object management table 53. Various contents in the video file are managed together with the attribute information as the video element object in the object management table 53. An object ID 531 representative of an identifier of the video element object and which identifies a record of the object management table 53 uniquely, a file ID 532 indicating a file which the object belongs to, a content ID 533 for identifying a content in the video file, an object attribute 534 indicating a kind of the video element object as to whether the object is video or audio or text stream, a beginning time code 535 and an end time code 536 indicative of a time section of the video element object are included in the object management table 53 in columns thereof. The object ID 531 corresponds to a combination of the file ID 532 and the content ID 533 in one-to-one manner. The content ID 533 may use an ID assigned within the video file to the content itself of the video file or may be assigned separately upon registration to the database. Further, in this example, the time codes are expressed in the SMPTE format and may use another expression format.

FIG. 5 shows an example of a configuration of the reference frame management table 54. Managed in the reference frame management table 54 are a frame image extracted from the video content as being characteristic in the video content and an image feature vector of the frame image. The frame image managed in the reference frame management table 54 is one extracted from the content and is not a frame image viewed by the user as a result combined when it is reproduced actually but is a frame image before combined. Further, the frame image is accompanied by an alpha plane for the chroma-key combination depending on the video content and is sometimes accompanied by designation such as overwriting, overwritten and superposed in semi-transparent manner upon combination with another video content. The alpha plane has been subjected to combination processing and treats a frame image which is not combined with another video content. The alpha plane is not limited to a binary value and has a standard of, for example, semi-transparence for expressing a smoke-like image. Calculation of the image feature vector is not applied to the area treated as being perfectly transparent by combination with the alpha plane, so that retrieval accuracy can be enhanced. The procedure of not applying the calculation of the image feature vector to a transparent portion is described later. The reference frame management table 54 includes in columns thereof an image ID 541 for identifying a reference frame, a video object ID 542 indicating a video element object from which the frame image is acquired, a time code 543 indicating an acquisition time of the frame, a video format 544 indicating a format of the frame image, a video itself 545 in which the frame image itself is stored and an image feature vector 546 for storing an image feature vector. The image format 544 and the image itself 545 are required to calculate the image feature vector but they are not required in the subsequent video retrieval process. Accordingly, the columns for the image format 544 and the image itself 545 are not indispensable to the reference frame management table 54.

FIG. 6 shows an example of a configuration of the center-of-gravity information management table 55. The center-of-gravity information management table 55 is used to manage positional information of an object in the original image as paired with the image ID in order to extract an image feature vector of only an object in a portion which is not transparent when a transparent portion is formed by combination with the alpha plane. For an object having no change in shape and having motion as a result of combination with the alpha plane, a plurality of center-of-gravity information records are sometimes prepared for one image ID. Further, when combination with the alpha plane is not accompanied, the center of gravity is assumed to be a center of image for convenience' sake. The center-of-gravity information management table 55 includes in columns thereof an image ID 551 corresponding to the image ID column of the reference frame management table 54 and a center of gravity X 552 and a center of gravity Y 553 which are normalized values of positions of the center of gravity in X and Y directions, respectively, in the range of 0 to 100. The center of gravity X 552 and the center of gravity Y 553 are the normalized values in the range of 0 to 100, while the center of gravity may be other format if it can specify the relative position of the center of gravity in the image.

FIG. 7 shows an example of a configuration of the video scene management table 56. The video scene management table 56 has no direct relation to the above-mentioned video element object and is a table for managing section information and representative frame images in sections defined between change points of scene in a video upon normal reproduction. The sections of video scenes are defined by executing a program for detecting the change points of video, upon registration of video data. The video scene management table 56 includes in columns thereof a scene ID 561 for identifying the video scene, a video file ID 562 indicating a video file in which the video file is included, a beginning time code 563 indicating the beginning of a time section of the video scene, an end time code 564 indicating an end of the time section of the video scene, a representative time code 565 indicating a time of an acquired representative frame image, an image format 566 indicating an image format of the acquired representative frame and an image itself 567 for storing an entity of the representative frame image. In the embodiment, one representative image is defined in one video scene but no representative image may be defined in one video scene or a plurality of representative images may be defined in one video scene.

FIG. 8 shows an example of a configuration of the text annotation management table 57. The text annotation management table 57 includes in columns thereof a text ID 571 for identifying individual text annotation records uniquely, a video file ID 572 indicating the video file in which the text annotation is included or the video file which the text annotation is related to when the text annotation is added by hand separately, a beginning time code 573 and an end time code 574 indicating a time section in which the text annotation is defined and a text information 575 in which a row of character codes are stored. The text information may include not only one extracted from the text stream of the video automatically but also one inputted by hand.

In FIG. 1, the processing modules 70 to 74 are modules concerned or operated mainly when a video file is stored in the video database. The processing modules 80 and 81 are modules concerned or operated mainly when a video scene is retrieved from the video database. Processing flow as a whole of the system is now described roughly with respect to registration and retrieval separately and then each processing will be described in detail.

<General Flow of Video File Registration Processing>

Registration of a video file can be divided into the following three processing procedures. The first processing is to preserve or store the video file itself in a storage unit. In this processing, the video file inputted from the video input terminal unit 10 is stored in the video file storage area 41 in the same format as it is or in the reproducible format. The second processing is to separate the video file into contents which are constituent elements thereof in the stream separation manner and then to register video element object information in the database. When this processing is performed in parallel with other processing, the video file inputted from the video input terminal unit 10 is processed in real time and the video object information is registered in the database. When the three processing procedures described here are performed one after another, this processing is performed to the video file stored once in the video file storage area 41. The third processing is to register video scene information obtained by dividing the video scene by change points of scene into the database. When this processing is performed in parallel with other processing, the video file inputted from the video input terminal unit 10 is processed in real time and the video scene information is registered in the database. In the case of successive processing, this processing is performed to the video file stored once in the video file storage area 41. The video file is registered in the video retrieval server 30 by means of the three registration processing procedures to thereby cope with a retrieval request from the user. The three processing procedures described above may be performed at the same manner in parallel or may be performed one after another. In the following description, these processing procedures are supposed to be performed at the same time in parallel.

<Preservation Processing of Video File in Video File Storage Area>

In the preservation processing of the video file in the video file storage area, processing for writing the video file in a magnetic disk is performed basically. When any of two other registration processing procedures is not completed normally, the video file written in this processing is invalidated. Further, when this processing fails in preservation of the video file, the two other registration processing procedures are invalidated.

<Registration Processing of Video Element Object Information>

Figure 9:
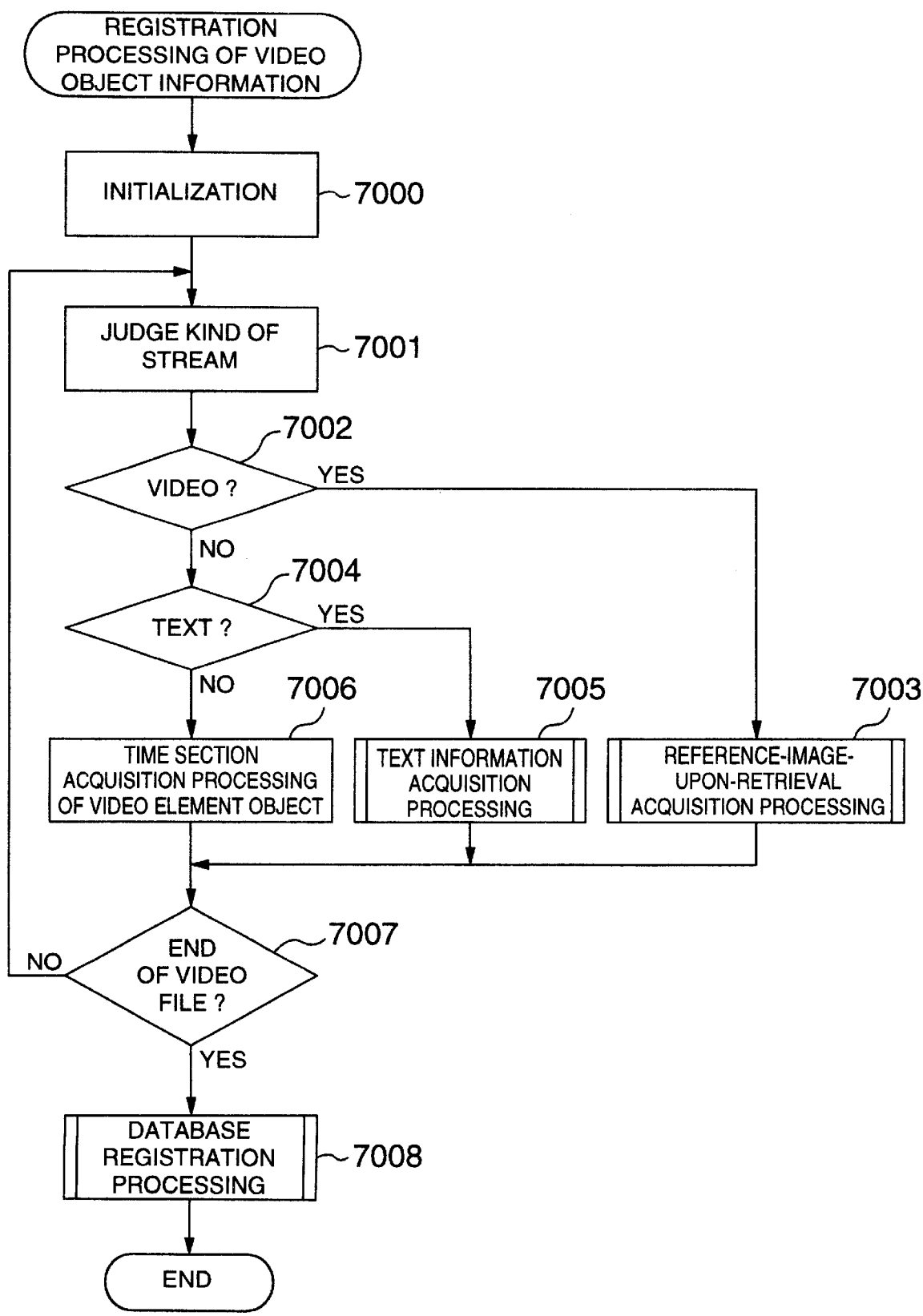
FIG. 9 is a flow chart showing an example of video object information registration processing.

FIG. 9 is a flow chart showing the registration processing of the video element object information. This processing is mainly performed by the video stream analysis processing module 70.

In this processing, first of all, preparation of the registration processing including an initialization of the temporary memory 60 is made in step 7000. When the preparation is completed, the module waits for a video file stream to be transmitted thereto. In subsequent step 7001, a kind of the stream is judged. In the judgment of the kind of stream, streams are classified into a video stream, a text stream and other streams to thereby judge the kind of stream in accordance with the classification. The other streams include an audio stream, a user definition stream and the like. Further, a plurality of kinds of video streams mixed are transmitted thereto. Accordingly, the processing for individual streams must be performed essentially in parallel with one another. Description is made for each stream one by one for simplification. In step 7002, when the kind of stream is judged as a video stream, the reference frame acquisition processing is performed in step 70003. This processing is described later in detail. Information concerning an image referred upon retrieval is stored in the temporary memory 60 by means of this processing. In step 7004, when the kind of stream is judged as a text stream, the text information acquisition processing is performed in step 7005. This processing is also described later in detail. The text information is stored in the temporary memory 60 by means of this processing. When the kind of stream is not judged as a text stream in step 7004, the kind of stream is regarded as a stream to which the retrieval is not applied and only acquisition of the time section of the video element object, that is, the beginning time code and the end time code thereof is performed in step 7006. The information is stored in the temporary memory 60. In next step 7007, it is judged whether the end of the video file is reached or not. When the end of the video file is not reached, the process is returned to step 7001 and processing for the stream is performed successively. When the end of the video file is reached, the annotation information of the video stored in the temporary memory is registered in the database in step 7008. This processing is also described later in detail. When the registration processing to the database is completed, the video object information registration processing is completed.

Figure 10:
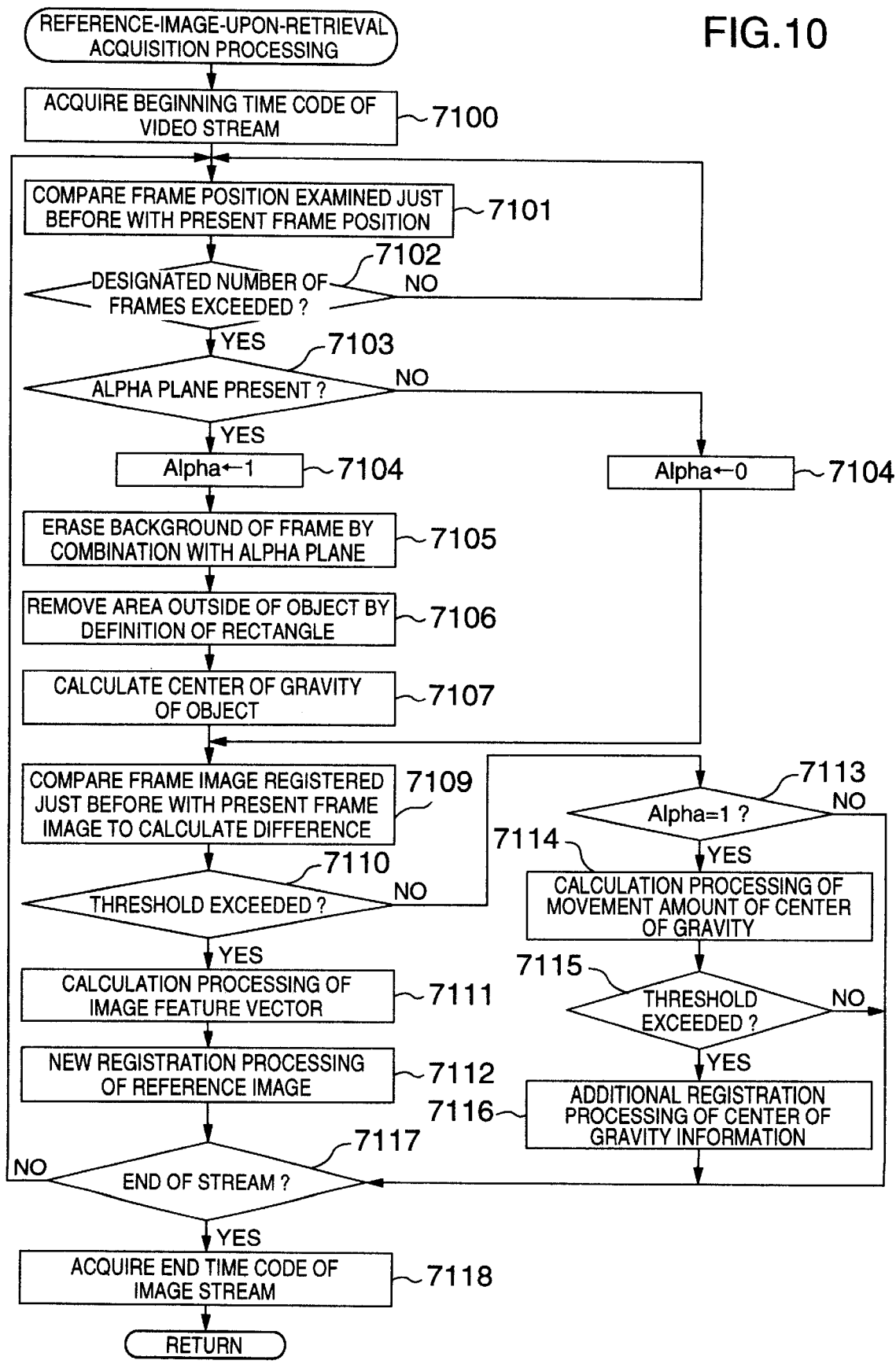
FIG. 10 is a flow chart showing an example of reference frame acquisition processing.

FIG. 10 is a flow chart showing the reference frame acquisition processing in step 7003 of FIG. 9. This processing corresponds to the reference frame acquisition processing 71 of FIG. 1.

First of all, the beginning time code of the video stream is acquired in step 7100. The subsequent processing is basically performed each time one frame is advanced. In subsequent step 7101, a frame position examined just before is compared with the present frame position. In step 7102, it is judged whether a difference of the frame position exceeds a previously designated number of frames or not. When the difference of the frame position is smaller than the designated number of frames, the process is returned from step 7102 to step 7101 and a next frame is processed successively. When the difference of the frame position is equal to or larger than the designated number of frames as a result of the judgment in step 7102, it is judged whether the current frame image has a portion processed to be transparent upon combination or not, that is, it is judged whether the alpha plane is defined or not in step 7103. When the alpha plane is defined, "1" is set to a variable "Alpha" in step 7104 to thereby indicate that the definition of the alpha plane is present.

Figure 11:
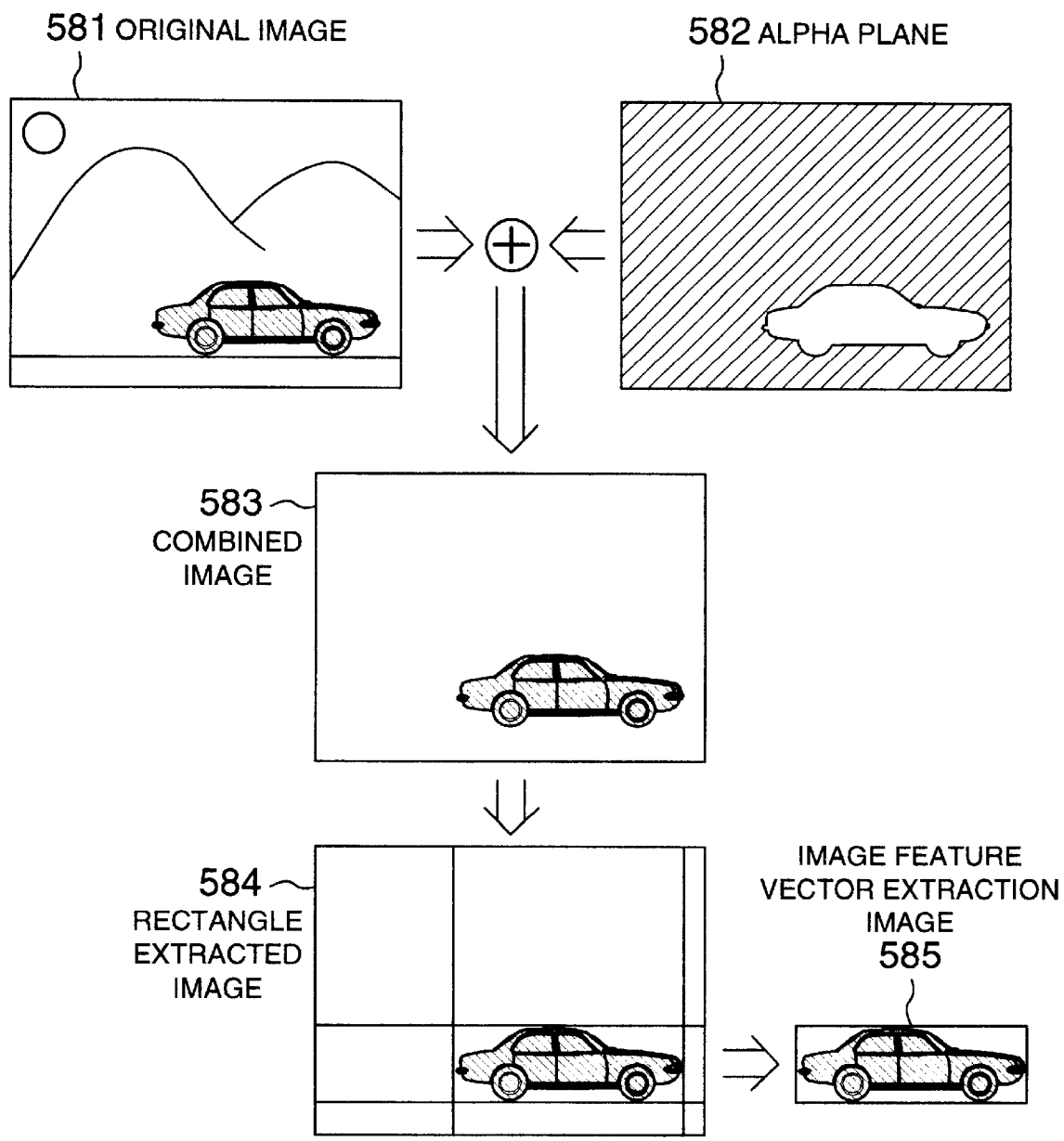
FIG. 11 illustrates an example for setting a rectangle to an image combined with an alpha plane.

A definite processing performed when the definition of the alpha plane is present is shown in FIG. 11. An original image 581 is one of the video contents. An automobile, mountains and the sun are imaged or displayed. The original image 581 is combined with a different video content upon reproduction. To this end, the original image 581 is combined with an alpha plane 582 in step 7105. The alpha plane has a binary value, that is, the alpha plane is perfectly transparent or not transparent at all. In FIG. 11, a perfectly transparent portion is hatched. A combined result is shown as a combined image 583, in which the mountains and the sun in the background are erased and only the automobile is imaged. The automobile is imaged eccentrically to the right lower corner of the image and accordingly when an image feature value is extracted from the combined image 583, this positional information is reflected even to the image feature vector of the automobile. In order to prevent the reflection of the positional information, two straight lines are drawn horizontally and vertically, respectively, so that the lines are tangent to the image area that is not transparent in step 7106. This state is shown in a rectangular extracted image 584. A rectangle having apices constituted by intersection points of the four lines is defined and the interior of the rectangle is used for extraction of the image feature vector. The image in the rectangle is shown as an image feature vector extraction image 585. The positional eccentricity or deviation of the object is removed by the definition of the rectangle and the image feature vector of the automobile can be calculated purely. In step 7107, the position of the center of gravity of the rectangle is calculated by the definition of the rectangle. The calculated position of the center of gravity is held as positional information of the object in the original image. Further, when the center of gravity of the object is calculated strictly instead of the center of gravity of the rectangle, the rectangle may be further divided and weighted average for divided positions where the object is present may be calculated.

In step 7103, when it is judged that the alpha plane is not defined in the current frame image, "0" is set to the variable "Alpha" in step 7108 and it is held that there is no definition of the alpha plane.

In step 7109, the reference frame acquired just before to be registered is compared with the present frame image to calculate a difference thereof. In step 7110, it is judged whether the difference is equal to or larger than a predetermined threshold or not. When the difference is equal to or larger than the threshold, the image is registered as the reference frame newly. In this case, the image feature vector is first calculated in step 7111. This processing corresponds to the image feature vector calculation processing 72 of FIG. 1. In next step 7112, the current time code, image data, image feature vector and the like are stored in the temporary memory 60. When the difference is smaller than the threshold, it is judged whether the alpha plane is defined or not with reference to the variable "Alpha" in step 7113. When "Alpha"=0, that is, it is judged that the alpha plane is not defined, the difference is small as compared with the frame registered just before and accordingly the process proceeds to step 7117 in order to perform the next processing. When "Alpha"=1 in step 7113, that is, when there is combination with the alpha plane even if the difference is smaller than the threshold, there is a possibility that an object has been moved in the picture. In this case, an amount of movement of the center of gravity is calculated in step 7114. It is judged whether the movement amount of the center of gravity exceeds a predetermined threshold in step 7115. When the amount exceeds the threshold, only information of the center of gravity is registered additionally in step 7116.

When the processing for the current frame image is completed, it is judged whether an end of the stream is reached or not in step 7117. When there is any frame image to be processed, the process is returned to step 7101 and processing for a next frame image is performed. When there is no frame image to be processed, the end time code of the stream is acquired in step 7118 and the process is returned to the original processing.

Figure 12:
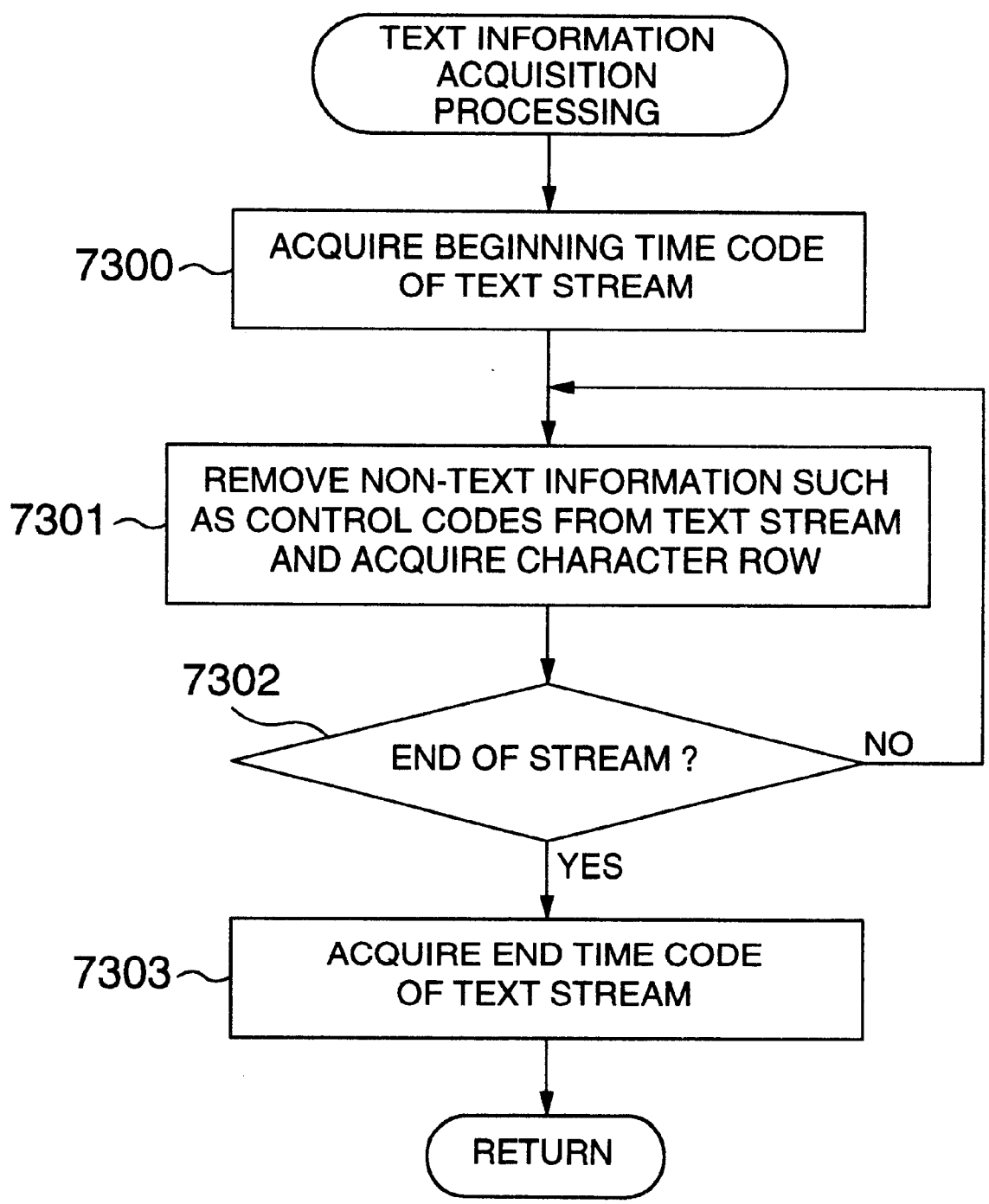
FIG. 12 is a flow chart showing an example of text information acquisition processing.

FIG. 12 is a flow chart showing the text information acquirement processing in step 7005 of FIG. 9. This processing corresponds to the text information acquisition processing 73 of FIG. 1.

First of all, the beginning time code of the text stream is acquired in step 7300. In subsequent step 7301, a row of character codes is acquired from the text stream. At this time, non-text information such as control codes can be removed from the row of character codes to be acquired to thereby reduce an amount of data. However, the row of character codes may be acquired in the same format as it is. In next step 7302, it is judged whether an end of the text stream is reached or not. When the end is not reached, the process is returned to step 7301 and a row of character codes is acquired. When the end of the text stream is reached, the end time code of the text stream is acquired in step 7303 and the process is returned to the original processing.

Figure 13:
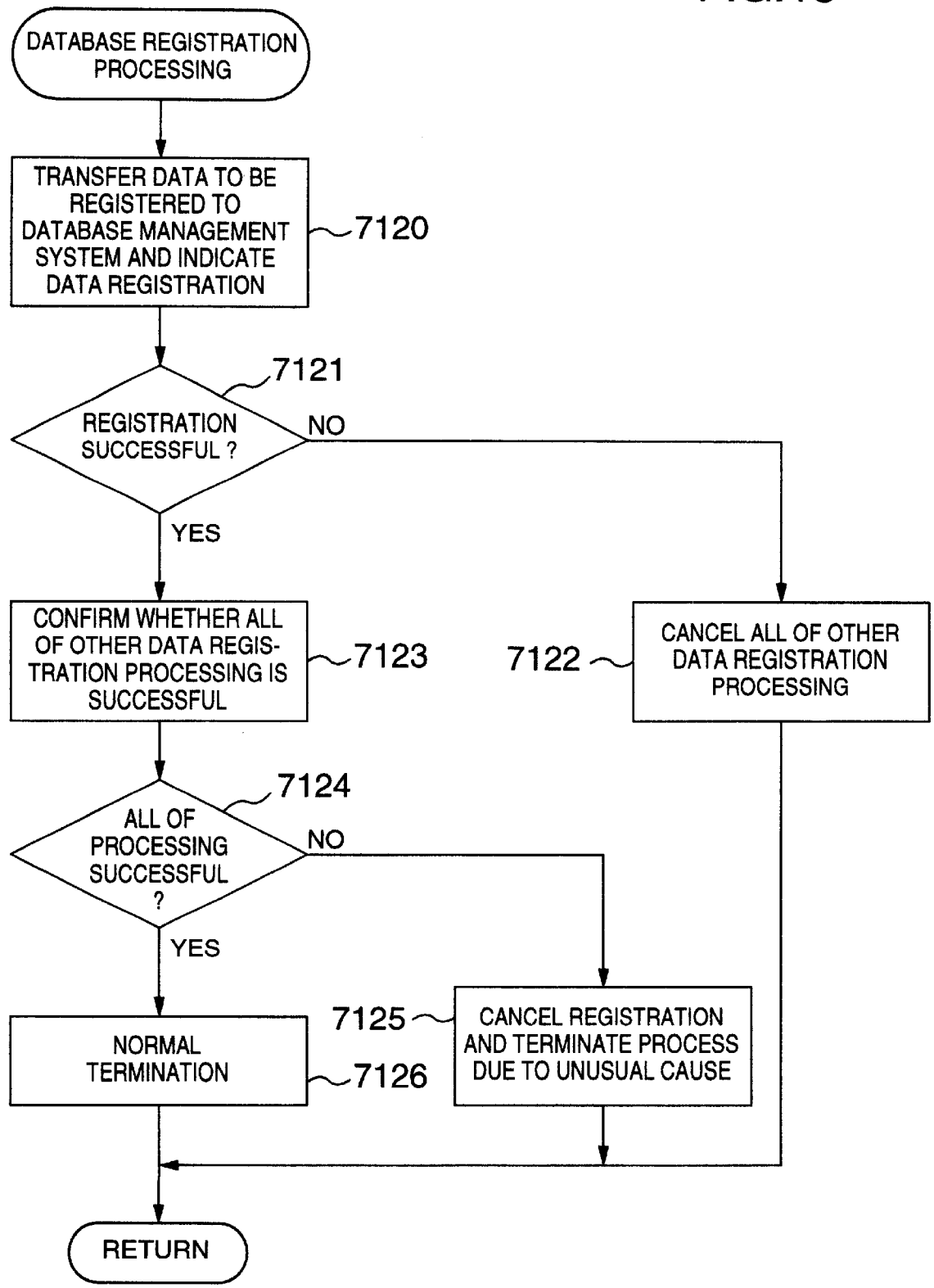
FIG. 13 is a flow chart showing an example of registration processing of video object information to a database.

FIG. 13 is a detailed flow chart showing database registration processing in step 7008 of FIG. 9.

Data acquired in the processing described as far to be registered in the database are all stored in the temporary memory 60. In step 7120, data to be registered is transferred to the database management system 50 and a registration command of the data is issued, so that the data registration processing to the video information table is performed in the database management system. In step 7121, it is judged whether the registration to the database is successful or not. When it is judged that the registration to the database is unsuccessful, other data registration processing, that is, the storing processing of the video file which is the first processing and the registration processing of the video scene information which is the third processing are canceled in step 7122. In this case, the video data registration processing results in failure. Consequently, the database is restored as if registration of video data were not made at all.

In step 7121, when it is judged that the registration processing is successful, it is confirmed whether other data registration processing, that is, the storing processing of video file and the registration processing of video scene information are successful or not in steps 7123 and 1724. When it is judged that at least any of them is unsuccessful, the registration processing performed in step 7120 is canceled and the process is terminated due to an unusual cause in step 7125. When it is judged that all of processing is successful, the normal termination processing is made in step 7126 and the process is returned to the original processing.

<Registration Processing of Video Scene Information>

Figure 14:
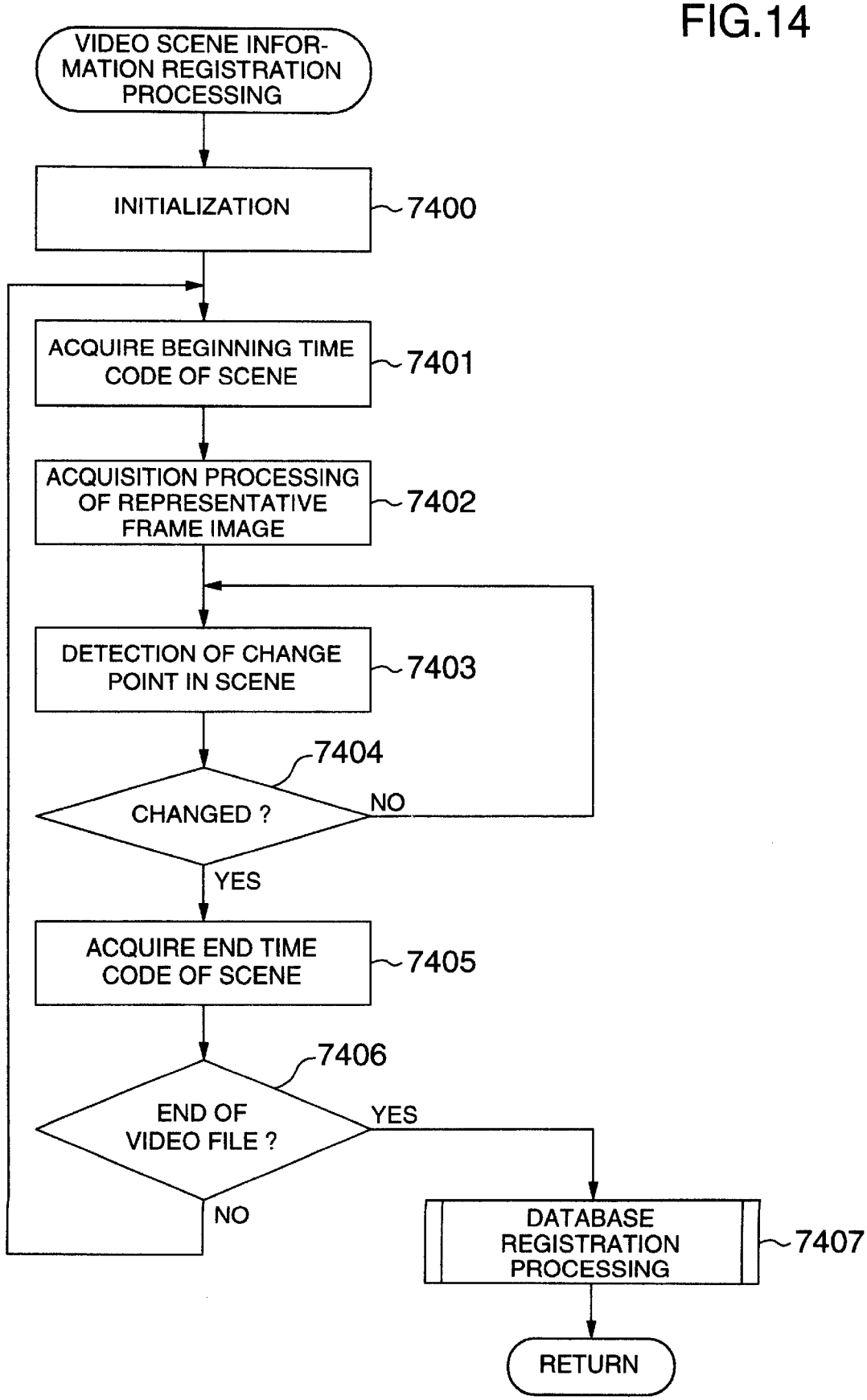
FIG. 14 is a flow chart showing an example of video scene information registration processing.

FIG. 14 is a flow chart showing the registration processing of the video scene information. This processing is mainly performed by the representative image acquisition processing module 74. In this processing, it is assumed that one frame image being at the head of scenes is acquired as a representative image for the scenes of video.

In the registration processing of the video scene information, first of all, preparation of the registration processing including an initialization of the temporary memory 60 is made in step 7400. When the preparation is completed, the module waits for a reproduced image of the video file to be transmitted thereto. When transferring of the reproduced image is started, the beginning time code of the scene is acquired in subsequent step 7401. In next step 7402, the acquisition processing of the representative frame image is performed. In this processing, the frame at the head of the scene is acquired as a representative image and the acquired representative image is stored in the temporary memory 60. In steps 7403 and 7404, after the representative image is acquired, it is judged whether there is any change in the scene or not. When it is not judged that the scene is changed, the process is returned to step 7403 so that it is judged whether the scene is changed or not successively. When it is judged that the scene is changed, the end time code of scene is acquired in next step 7405. The end time code strictly corresponds to a time code positioned just before the time code that it was judged that the scene has been changed. In step 7406, it is judged whether the end of the video file is reached or not. When the end of the video file is not reached, the process is returned to step 7401 and the same processing is repeated for next scene information. When it is judged that the end of the video file is reached, the registration processing to the database is performed in step 7407. This processing is described later in detail. When the registration processing to the database is terminated, the video scene information registration processing is completed.

Figure 15:
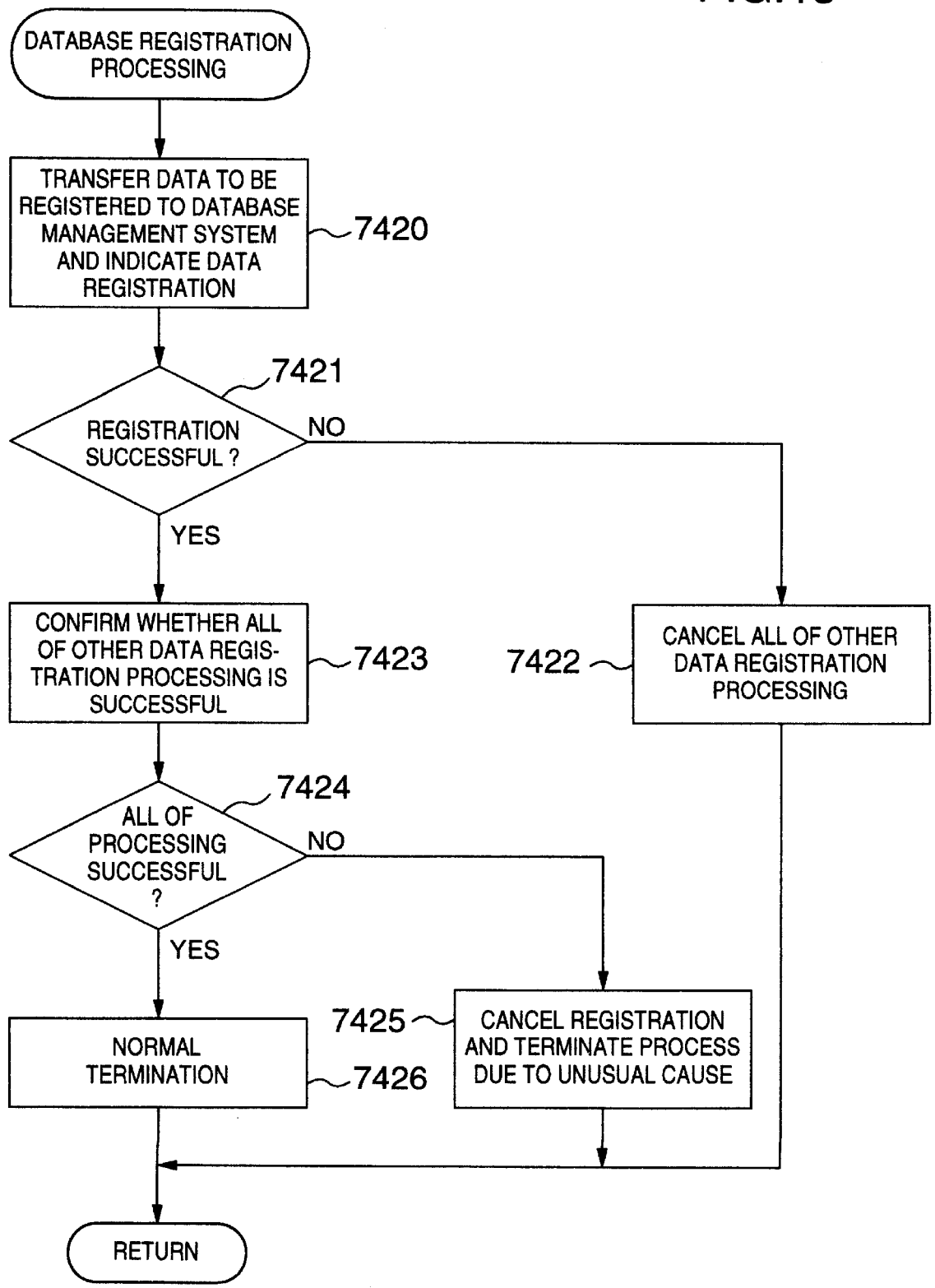
FIG. 15 is a flow chart showing an example of registration processing of video scene information into a database.

FIG. 15 is a detail flow chart showing the database registration processing in step 7407 of FIG. 14. This processing is basically identical with the processing shown in FIG. 13.

Data to be registered in the database are all stored in the temporary memory 60 by means of the processing performed so far. First of all, in step 7140, data to be registered is transferred to the database management system 50 and a registration command of the data is issued. The database management system 50 receives the registration command and performs the registration processing of the data transferred to the video information table. In step 7421, it is judged whether the registration processing is successful or not. When it is judged that the registration processing is unsuccessful, other data registration processing, that is, the storing processing of the video file which is the first processing and the reference frame acquisition processing which is the second processing are canceled in step 7422. In this case, the video data registration processing results in failure. Consequently, the database is restored as if registration of video data were not made at all. In step 7421, when it is judged that the registration processing is successful, it is confirmed whether other data registration processing, that is, the storing processing of video file and the acquisition processing of the reference frame are successful or not in steps 7423 and 7424. Consequently, when it is judged that at least one of them is unsuccessful, the registration processing is canceled and the process is terminated due to an unusual cause in step 7425. When it is judged that all of processing is successful, the normal termination processing is made in step 7426 and the process is returned to the original processing.

<General Flow of Video Scene Retrieval Processing>

The retrieval processing of the video scene is now described. The retrieval of the video file is performed by a video retrieval application program operated in the video retrieval terminal unit 20. A picture during execution of this application program is shown in FIG. 16.

Figure 16:
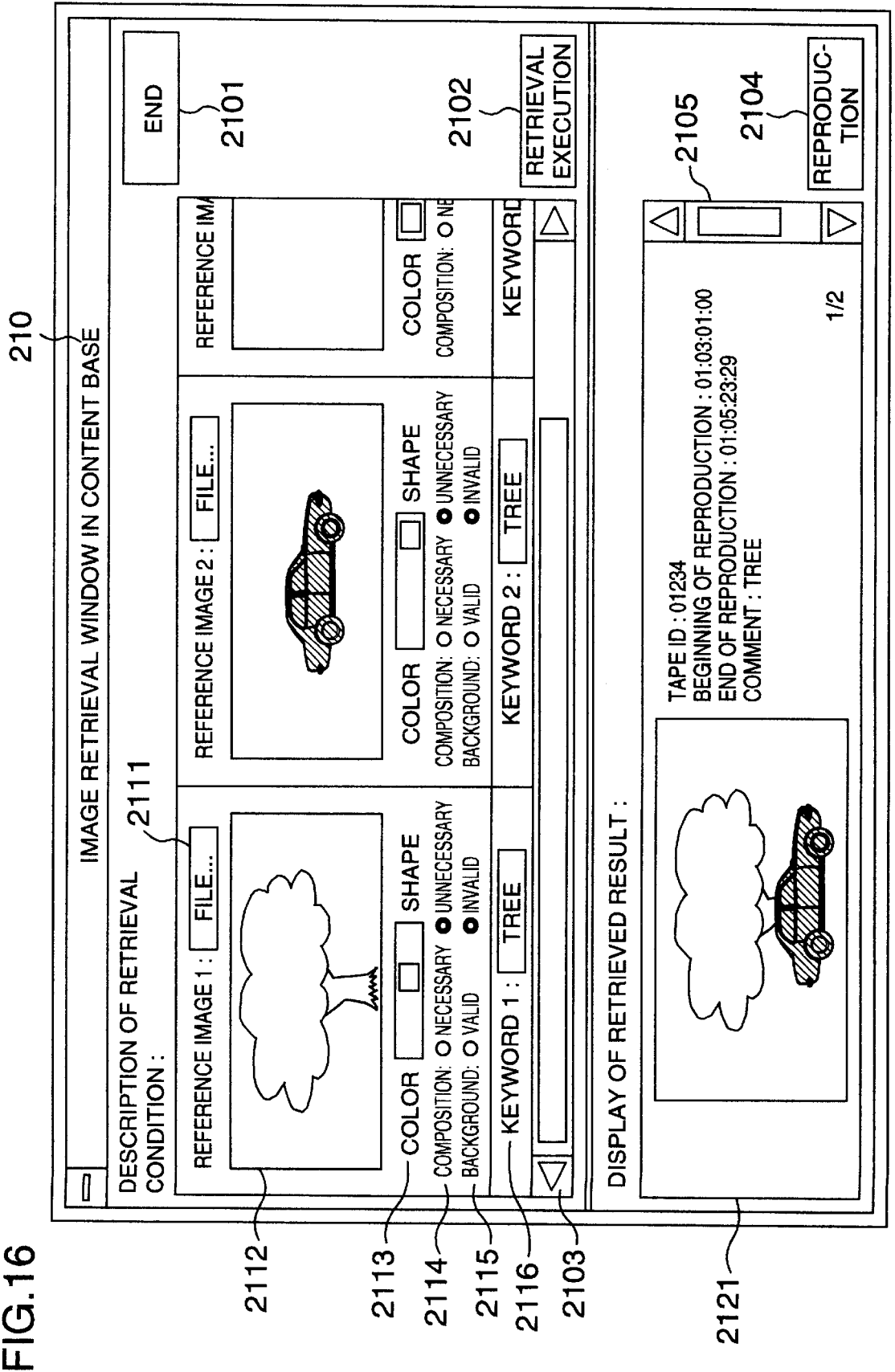
FIG. 16 shows an example a retrieval picture displayed in a display unit of a video retrieval terminal unit.

The execution picture shown in FIG. 16 has an upper half area for description of retrieval conditions and a lower half area for confirmation of a retrieved result. In the description of the retrieval conditions, an image and a keyword by a text can be used together. A button 2111 is to open an external reference image file to be read in. A reference image file read in is displayed in a sub-window 2112. The user can operate a sliding bar 2113 to set the degree of importance to color and shape used in retrieval of similarity of an image based on the reference image. Further, the user can use a radio button 2114 to set whether to consider a composition or not upon retrieval of image. In addition, the user can use a radio button 2115 to designate whether to validate or invalidate the background portion of the reference image upon retrieval of image. When it is designated that the background portion of the reference image is invalidated and the background of the reference image is colored by a single color, the background is removed from the reference image in the same manner as the processing of preparing the image feature vector extraction image 585 from the rectangular extracted image 584 shown in FIG. 11. A keyword can be inputted in a keyword input blank space 2116 to make retrieval using the keyword. Further, the "reference image 1" and the "keyword 1" are arranged above and below in the picture, while the positional relation is not directly related to retrieval. In other words, even if contents in the "keyword 1" and the "keyword 2" are replaced with each other while maintaining the "reference image 1" as it is when a plurality of retrieval conditions are set, the retrieved result is not influenced.

In the embodiment, when a plurality of retrieval conditions are set, it is assumed that all of the retrieval conditions are subjected to set operations of a logical product relative to the time section. Simple retrieval operation is now described by way of example with reference to FIG. 16.

The user first presses the button 2111 with indication of "file" to read an external file in the reference image 1 and displays an image of previously prepared tree in the reference image display window 2112. The sliding bar 2113 is used to set that shape is slightly important when similarity is investigated on the basis of the image. The composition is not designated by means of the button 2114. In other words, this indicates that it does not matter even if the object of the reference image is imaged or displayed anywhere in the video. Even if an object is displayed before an object having the shape of tree, it is expected that an image similar to the tree is retrieved without problem when these objects are coded in the content base and treated as different contents. Since the background is invalidated by means of the button 2115, blank space around the reference image is neglected.

"Tree" is inputted in the keyword 1. This keyword is designated to supplement the reference image 1. Further, even if the keyword is inputted in the blank space of the keyword 2, the retrieved result is identical. An image of an automobile is taken as the reference image 2. In the drawing, the shape thereof is considered to be most important and it is designated that the composition is unnecessary and the background is invalid. The single color portion around the image of the automobile is removed upon calculation of the image feature vector. The user can move a horizontal scroll bar 2103 to thereby set the condition using a reference image 3 and so on, while in this example it is assumed that the retrieval condition is not set any longer.

Figure 17:
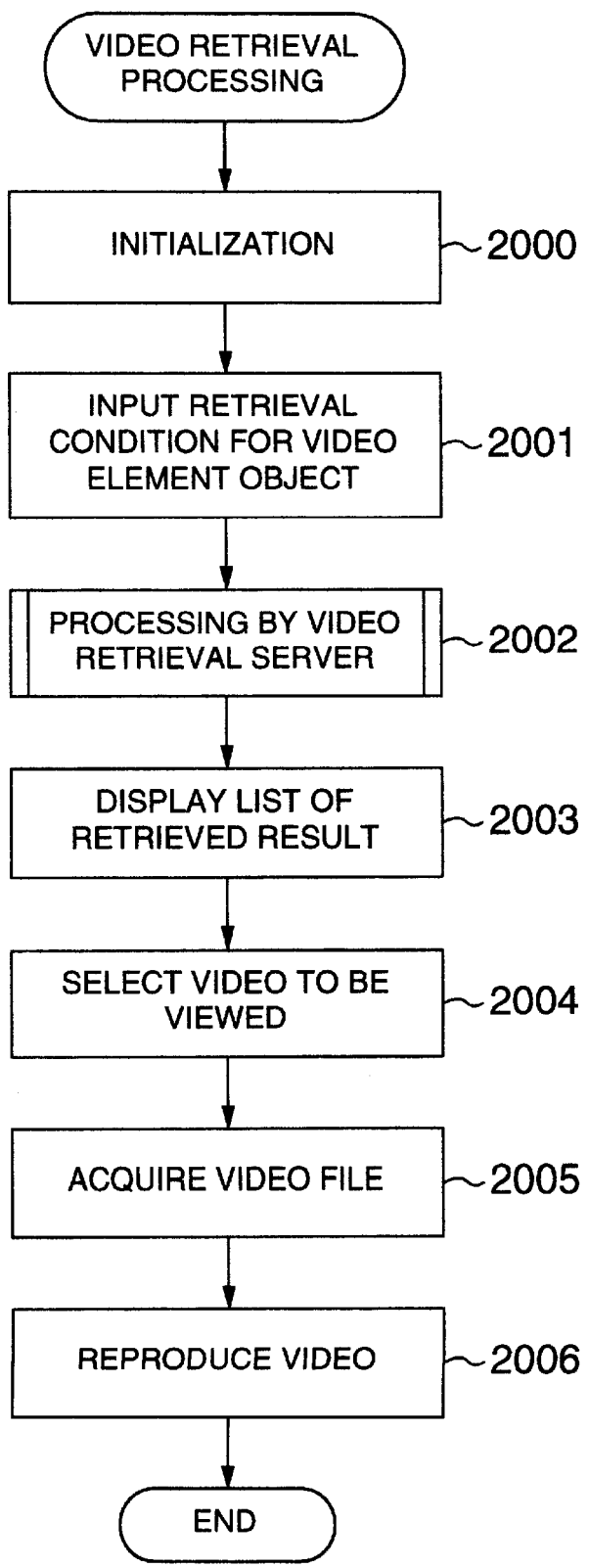
FIG. 17 is a flow chart showing an example of video retrieval processing in the video retrieval terminal unit.

When a "retrieval execution button" 2102 is depressed, retrieval is carried out. Thereafter, when a reproduction button 2104 is depressed, an image is reproduced. FIG. 17 is a flow chart showing the processing performed by the video retrieval terminal unit 20 in the course from the retrieval to the reproduction.

First of all, initialization is made in step 2000, so that the reference images and the keywords are cleared and options such as color, shape, composition and background are set to default values. In next step 2001, a video retrieval condition is set by the user. In this processing, it is assumed that the retrieval condition as shown in FIG. 16 is set. When the retrieval execution button 2102 is depressed, the process proceeds to step 2002, in which the retrieval request is transmitted through the communication network 90 to the video retrieval server 30 and the video retrieval processing 80 is performed. This processing is described later. As a result of the retrieval processing, a retrieved result set is returned through the communication network 90 to the video retrieval terminal unit 20 and the retrieved result is displayed in step 2003. The retrieved result is displayed as shown in an area 2121 of the display picture of FIG. 16, for example. In step 2004, when the user presses the button 2104, the image to be viewed is selected to issue a reproduction request of image. The video file is acquired from the video retrieval server 30 in response to the reproduction request in step 2005 and the video is reproduced in step 2006. Further, when the button 2101 on the picture is pressed, the retrieval application is terminated.

Figure 18:
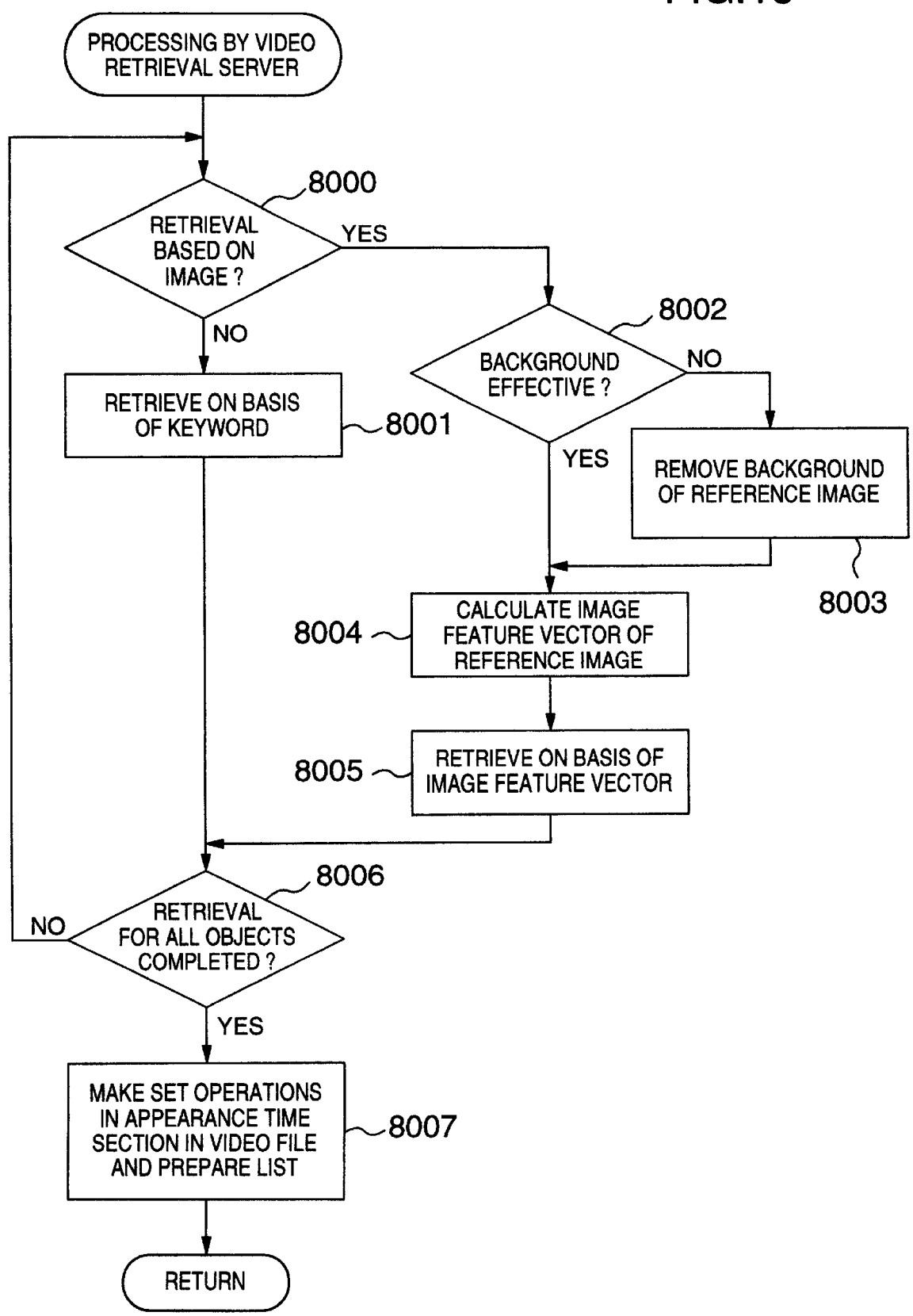
FIG. 18 is a flow chart showing an example of video retrieval processing in a video retrieval server.

FIG. 18 is a flow chart showing the video retrieval processing performed by the video retrieval server 30 in step 2002 of FIG. 17.

In the video retrieval processing, when the a processing request is supplied to the video retrieval server, the following three retrieval conditions are transmitted to the server together with the request. The first condition includes information that the image data is tree, the shape is considered to be slightly importance, the composition is unnecessary and the background is invalid, The second condition includes the keyword "tree". The third condition includes information that the image data is automobile, the shape is considered to be most important, the composition is unnecessary and the background is invalid. In this case, when it is considered that the retrieval processing is performed one after another, the retrieval processing is performed three times.

The video retrieval server 30 judges whether the retrieval condition is based on the image data or not in step 8000. When it is judged that the retrieval condition is not based on the image data, the retrieval is made on the basis of the keyword and a retrieved result thereof is stored in the temporary memory 60 in step 8001. In this retrieval, a file ID and a beginning time code and an end time code of a pertinent time section are retrieved. In step 8000, when it is judged that the retrieval condition is based on the image data, the process proceeds to step 8002. In step 8002, it is judged whether the background is effective or not. When the background is not effective, the process proceeds to step 8003 in which the background of the reference image is removed in the same manner as the processing procedure of taking out the image feature vector extraction image 585 from the combined image 583 of FIG. 11. Thereafter, in step 8004, the image feature vector of the reference image is calculated (by the processing module 72 of FIG. 1) and in step 8005 retrieval using the image feature vector of the database is performed (by the processing module 81 of FIG. 1). On the other hand, when the background is effective, the process skips over step 8003 and proceeds to step 8004. In an example of FIG. 18, any of two image retrievals is subjected to the processing in step 8003. As a result of the retrieval based on the image, when the similarity is larger than a predetermined value and it is considered that the image coincides with the retrieval condition, the file ID and the beginning time code and the end time code of the pertinent time section are acquired as the retrieved result. The video retrieval server 30 confirms in each retrieval processing whether retrieval for individual video element objects is all completed or not in step 8006. When not completed, the process is returned to step 8000. In this example, after the processing described so far is repeated three times, it is considered that the retrieval for the individual video element objects is all completed and the process proceeds to step 8007. In step 8007, a set of retrieved results stored in the temporary memory 60 is subjected to the set operations (logical product in the embodiment) in the appearance time section in the file and a list of retrieved results is prepared, so that a list of the file ID and the beginning time code and the end time code of the pertinent time section is returned to the video retrieval terminal unit as the retrieved result. Thereafter, the processing is returned to the video retrieval terminal unit 20.

As described above, according to the present invention, when the user's desired video is retrieved from the video database, it is possible to designate a retrieval condition based on spatial, temporal and meaningful arrangement of a plurality of contents which are constituent elements of the video, so that the user is merely required to materialize the user's own image of the video in each content and time required to retrieve a target video can be reduced.

What is claimed is:

1. A video information retrieval method implemented by a computer in order to register video files in a database and retrieve an arbitrary section of an arbitrary video file, comprising the steps of:

receiving a video file including a plurality of video streams coded in each content to be a constituent element thereof;

analyzing said video file to extract each of said plurality of video streams as video element objects;

extracting annotation information capable of designating as a retrieval condition from each of said video element objects;

registering information of said video element objects including a reference image indicating a representative image in said video element objects, and said annotation information in the database, wherein said reference image is extracted by making a comparison of images from said video streams constituting said video element objects at regular intervals and extracting, when images having a large similarity are continued, only one image which appears first thereof as said reference image;

retrieving said annotation information extracted by said each of video element objects in accordance with the retrieval condition of a video designated by a user to acquire time sections as a retrieved result; and defining a video scene with a set operation applied to said time sections to present the video scene to the user as the retrieved result.

2. A video information retrieval method according to claim 1, further comprising the steps of:

receiving a user's designation from the video scene; and acquiring a video file including the video scene designated by the user from the database and reproducing a video therefrom.

3. A video information retrieval method according to claim 1, wherein said registering step comprises:

extracting a reference image indicating a representative image in said video element objects referred upon retrieval from said video element objects;

acquiring from said reference image, an image feature vector representative of a feature thereof; and storing said reference image and said image feature vector in relation to said video element objects.

4. A video information retrieval method according to claim 3, wherein said image feature vector includes analyzed results for overall tint, local tint and edge information of said reference image.

5. A video information retrieval method according to claim 1, wherein said video streams include a video stream, an audio stream, a text stream and other streams unique to individual video files so that video element objects are constituted therefrom.

6. A video information retrieval method according to claim 1, wherein the retrieval condition is designated by the user for each video element object on the basis of said annotation information of the video expressed by text, a representative-image-of-video-scene and/or a similarity-of-image-feature-vector.

7. A program loaded in an internal memory of a computer in order to register video files in a database and retrieve an arbitrary section of an arbitrary video file, comprising software code portions for performing:

receiving a video file including a plurality of video streams coded in each content to be a constituent element thereof;

analyzing said video file to extract each of said plurality of video streams as video element objects;

extracting annotation information capable of designating as a retrieval condition from each of said video element objects;

registering information of said video element objects including a reference image indicating a representative image in said video element objects, and said annotation information in the database, wherein said reference image is obtained by making a comparison of images from said video streams constituting said video element objects at regular intervals and extracting, when images having a large similarity are continued, only one image which appears first thereof as said reference image;

retrieving said annotation information extracted by said each of video element objects in accordance with the retrieval condition of a video designated by a user to acquire time sections as a retrieved result; and defining a video scene with a set operation applied to said time sections to present the video scene to the user as the retrieved result.

8. A program according to claim 7, further comprising software code portions for performing:

receiving a user's designation from the video scene; and acquiring a video file including the video scene designated by the user from the database and reproducing a video therefrom.

9. A program according to claim 7, wherein said registering step comprises:

extracting a reference image indicating a representative image in said video element objects referred upon retrieval from said video element objects;

acquiring from said reference image, an image feature vector representative of a feature thereof; and storing said reference image and said image feature vector in relation to said video element objects.

10. A program according to claim 9, wherein said image feature vector includes analyzed results for overall tint, local tint and edge information of said reference image.

11. A program according to claim 6, wherein the retrieval condition is designated by the user for each video element object on the basis of said annotation information of the video expressed by text, a representative-image-of-video-scene and/or a similarity-of-image-feature-vector.

12. A video information retrieval apparatus for registering video files in a database and retrieving an arbitrary section of an arbitrary video file, comprising:

analysis means for stream-analyzing a video file including a plurality of video streams coded in each of contents which are constituent elements and to be combined upon retrieval, and for extracting each of said plurality of video streams as video element objects;

extraction means for extracting annotation information capable of designating as a retrieval condition from each of said video element objects extracted by said analysis means, registration means for registering information of said video element objects including a reference image indicating a representative image in said video element objects, and said annotation information in the database, wherein said reference image is obtained by making a comparison of images from said video streams constituting said video element objects at regular intervals and extracting, when images having a large similarity are continued, only one image which appears first thereof as said reference image;

retrieval means for retrieving said annotation information extracted by said each of video element objects in accordance with the retrieval condition of a video designated by a user to acquire time sections as a retrieved result; and output means for defining a video scene with a set operation applied to said time sections to present the video scene to the user as the retrieved result.

13. A video information retrieval apparatus according to claim 12, further comprising:

means for receiving a user's designation from the video scene presented to the user in said output means; and means for acquiring a video file including the video scene designated by the user from the database and reproducing a video therefrom.

14. A video information retrieval apparatus according to claim 12, wherein said registration means comprises:

reference image extraction means for extracting a reference image indicating a representative image in said video element objects referred upon retrieval from said video element objects;

image feature vector calculation means for acquiring from said reference image, an image feature vector representative of a feature thereof; and storage means for storing said reference image and said image feature vector in relation to said video element objects.

15. A video information retrieval apparatus according to claim 14, wherein said image feature vector includes analyzed results for overall tint, local tint and edge information of said reference image.

16. A video information retrieval apparatus according to claim 12, wherein said video streams include a video stream, an audio stream, a text stream and other streams unique to individual video files so that video element objects are constituted therefrom.

17. A video information retrieval apparatus according to claim 12, wherein the retrieval condition is designated by the user for each video element object on the basis of said annotation information of the video expressed by text, a representative-image-of-video-scene and/or a similarity-of-image-feature-vector.

* * * * *